United States Patent

Chavez

[15] 3,644,929

[45] Feb. 22, 1972

[54] TELEVISION MONITORING AND PROGRAM INFORMATION DISPLAY DEVICE AND METHOD

[72] Inventor: Ethor S. Chavez, 7631 Pomelo Drive, Canoga Park, Calif. 91304

[22] Filed: Sept. 21, 1970

[21] Appl. No.: 73,747

[52] U.S. Cl. ....................................346/1, 346/17, 346/37, 35/48 R, 58/4 R

[51] Int. Cl. ....................................................H04h 9/00

[58] Field of Search ..................346/37, 17, 1, 74 M; 353/44; 35/48; 325/31, 311; 179/2 AS

[56] References Cited

UNITED STATES PATENTS

| | | | |
|---|---|---|---|
| 2,660,507 | 11/1953 | Cordell | 346/37 X |
| 3,217,486 | 11/1965 | Chavez | 58/4 |
| 3,453,641 | 7/1969 | Rahmel | 346/37 X |

*Primary Examiner*—Joseph W. Hartary
*Attorney*—Julian J. Schamus and Richard L. Mikesell

[57] ABSTRACT

A continuous real time method for storing information as to which, if any, channel a particular television or radio set is tuned to, and the composition of the audience.

4 Claims, 3 Drawing Figures

Figure 1:
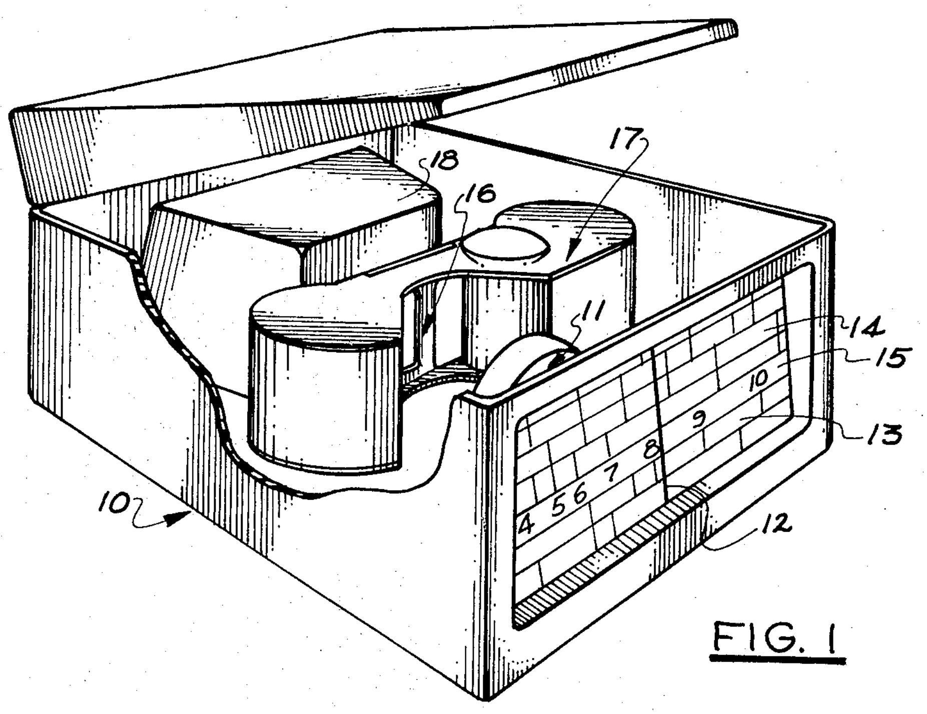

INVENTOR.
ETHOR S. CHAVEZ
BY
Julian J. Schamus
ATTORNEY

TELEVISION MONITORING AND PROGRAM INFORMATION DISPLAY DEVICE AND METHOD

PRIOR ART

There is a continuing need for television surveys, that is to say, surveys which determine which programs are being watched most frequently by what segments of the population. Based upon these surveys, large amounts of money is spent for consumer-oriented advertising and other large sums are risked on new types of shows which presumably would find favor with the viewing audience. There have been problems with existing methods of audience survey. Perhaps some problems are more real than others, but all are voiced from time to time.

The term "marginal utility" is familiar to audience survey systems. This refers to the hitherto inevitable result of any system, however inexpensive, of eventually reaching a sample size whereby additional samples, although useful, are not sufficiently useful to justify their expense. Naturally, this marginal utility occurs at a larger sample number in systems with more inexpensive samples.

It has been theorized that typical audience samplings are not large enough and are not representative. It has been further theorized that no questioning form would be accurate inasmuch as the questioning itself biases the questioned viewer. Further, all existing methods of television survey result in data that is not suitable for direct computer consumption, but must be translated. Accordingly, there typically is an undesirable large data acquisition cost in present survey methods. This frequently results in an economically feasible survey having an undesirably small sample.

It is an object of this invention to provide a real time device for storing detailed information as to the programs, if any, which an appendent television set is receiving.

It is a further object to provide a device for storing information as to audience composition.

It is a still further object to provide a device for storing information as to the favor or disfavor of various household members concerning details within broadcasts.

It is a still further object to provide means for polling of broadcast audiences.

It is a still further object to provide for a population sampling system which will be free from the sample size limiting factor, expiring marginal utility, and thus be free to attain any sample size.

It is a still further object of this invention to provide such a system whose data will not be affected by the attitude of the viewer towards the survey taking.

It is a still further object of this invention to provide such data in a computer compatible readout form.

The above and other objects of this invention are in part accomplished by a method and apparatus for monitoring the use of a television set and simultaneously displaying programming information to a viewer, comprising providing a continuously operating multichannel recording and display means, means for simultaneously indicating available program information and determining which one of a series of television channels is functional at any time by constant monitoring of the output of said television set through detection of a signal from any operative channel thereof, amplifying said signal, imposing said signal on at least one channel of said multichannel recording and display means, and subsequently transcribing the presence or absence of said signal from said recording and display means.

U.S. Pat. No. 3,217,486 issued to to E. S. Chavez, describes a device which enables a viewer to have a real time picture of what radio or television programs are presently receivable in the area and those that will be available in the near future.

The present invention contemplates a recording tape synchronized to a display tape, for instance of the type used in the above device. The recording tape is preferably not visible to the viewer. This tape slowly passes a device suitable for indicating on said tape whether the television set is on and, if so, to which channel the television set is tuned. It is additionally desirable to indicate the composition of the audience watching the particular television set to which the device is attached. It is preferred that this tape be impressed in a fashion whereby the results impressed upon it over the course of the viewing life of the tape, for instance, a week, could be read very quickly by a data processing device.

In the preferred mode of practice in the instant invention, the channel to which the television set, when on, is tuned is indicated by the oscillations emitting from the television tuner. As is known to those skilled in the art, these oscillations are a function of the channel to which the television set is tuned. For instance, channel 2 oscillates at 101 megaHertz, channel 9 at 233 megaHertz, etc. If this local oscillation is put into a proper array of tuned circuits, the circuit corresponding to the channel tuned will resonate. In practice it has been found most desirable to use the television antenna as the pickup point and to put a simple RF amplifier between the oscillator signal and the tuned circuits. Similarly, it has been found more practicable to use tuned circuits of the familiar tank type, i.e., a variable capacitor in parallel with an inductor for the VHF signal. A simple parallel tuned capacitor is used for the UHF signal. The inductance is not necessary in the UHF circuit since the line itself provides sufficient inductance for resonant tuning of such high frequencies.

The next desirable step is to rectify the oscillating output of the resonant circuits, using a diode circuit, and causing this rectified output to turn on one or more of a set of relay, transistorized or magnetic core switches. These switches energize corresponding magnetic recording head combinations with 60-cycle electrical excitation.

As will be apparent to those familiar with digital transmission, four switches can indicate either that the set is off or that any of 15 channels is on. For instance, the set being off could be indicated by all four switches being off. Channel 2 being on could be indicated by the last three switches off and the first on. Channel 4 could be indicated by the last two switches off, the second on and first off. Channel 5 may be indicated by the last two switches being off and the first and second on.

Finally, a plurality of manually operated button switches each operated by and designating a household member is similarly arranged to turn on one or more of a second set of four relay switches and thus energize corresponding magnetic head combinations at tape locations relatable to specific programs.

Fifteen manually actuated switch contact positions are provided; five for each of three monitored household members. Each monitored member is provided with one two-position switch for signaling in and out of audience, and one three-position switch for registering favor, neutrality or disfavor concerning details within broadcasts.

The magnetic tape record will thus be an audience reaction, audience composition, and tuning history of an appendent television or radio set.

In order to produce a recorded signal, the four relay switches are used to actuate a 60-cycle signal impressed on a four-channel magnetic tape by four magnetic recording heads. The blank tape may be free of ordered magnetic impression and the 60-cycle signal used to register changes of switching states; or the blank tape may be preimpressed with a linearly cyclic magnetic impression, the the 60-cycle signal used to register changes of switching states. The first method has the advantage of simplicity, while the latter method has the advantage of a higher possible signal to noise ratio.

The advantage of magnetic tape for a recording mode is that the tape can be operated very slowly, say at 1 inch per hour, in use by the consumer and can be run thousands of times faster by a computer to extract the information from it. Another advantage in the use of four channels in a binary on/off mode is that a large noise to signal ratio is tolerable and accordingly relatively inexpensive components and circuits can be used to detect and register the signal. In practice, it is desirable that the filmstrip, combining the display and magnetic tape, be in a readily removable cartridge. In this form it can easily be replaced periodically with current cartridges. Naturally, as it is replaced, the data-laden magnetic tapes will be replaced with blank tapes.

Referring now to the drawings:

FIG. 1 illustrates a complete program device, shown in perspective.

FIG. II illustrates a section of transparent tape with a magnetic tape appended thereto.

FIG. III is a block diagram of an electronic system employed in the invention.

FIG. I shows a program display device 10, comprising a display screen 13 on which the present time is indicated by a crosshair 12 behind which moves a display of programs 14 and a time scale 15.

In this embodiment of the invention, the display screen 13 is a translucent surface, and the information array 14 is projected onto it through a lens 11. Film 16 is contained in a replaceable cartridge 17, and is driven by, for instance, a sprocket mechanism in front of an enclosure 18 containing the projection lamp and the requisite magnetic recording heads. It is to be understood that the number of these recording heads is variable, depending upon whether both information as to audience composition and programs watched is desired, or just one of these. Additionally, it can be seen that an array of only three magnetic heads will enable the instant device to record "off" or "on" for each of seven stations.

It is to be understood that the particular embodiment of the device shown in FIG. I, i.e., with a projected image, horizontally centered time scale, and a vertically mounted cassette, is only one possible configuration. The principals of this invention reside in the magnetic tape real time storage of information simultaneously with the graphic display of television viewer (or radio listener) oriented information.

Figure 2:
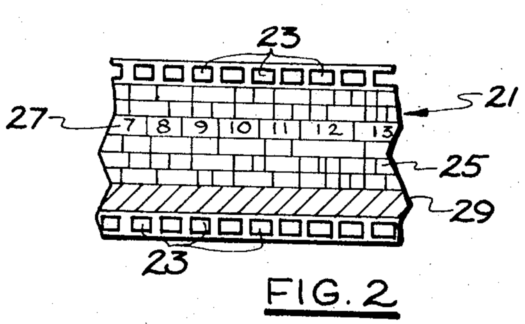
Figure 3:
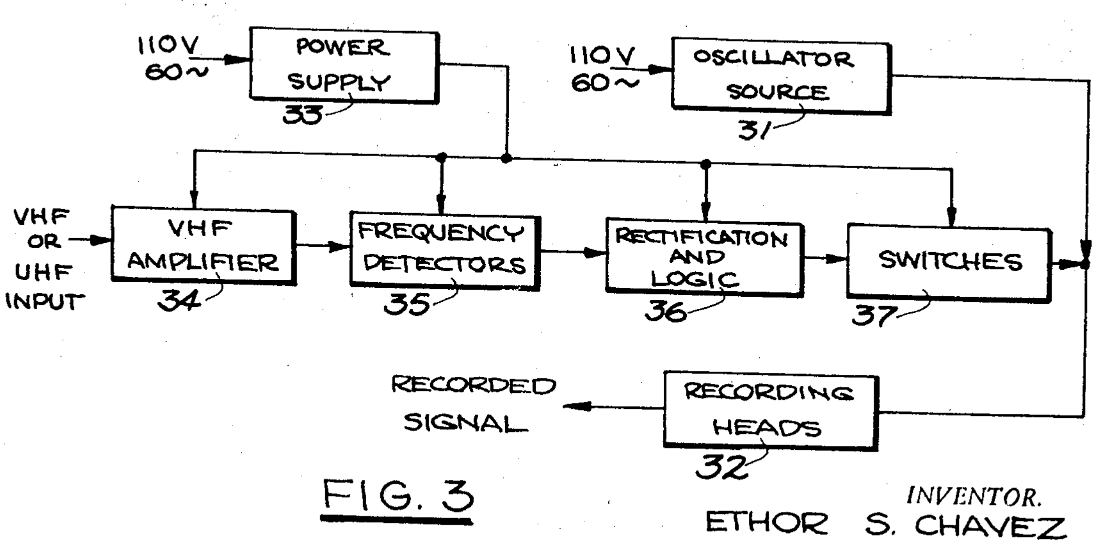

FIG. 2 illustrates a piece of information-rendering gathering tape 21 useable in the preferred embodiment. It is equipped with sprocket drive holes 23. The upper portion of the tape contains program information 25 and a time scale 27 visually stored. The lower portion 29 is paramagnetic oxide, suitable for recording electromagnetic impulses.

The electronic portion of the monitoring system used to transfer the information onto the tape 21, in one embodiment, is illustrated in FIG. III. Basically, the electronic portion of the monitor consists of circuitry to amplify and decouple the monitor from the television set at its regular local oscillator frequency to which the set is tuned, to incode this information, and to record the information on the magnetic tape. This is accomplished in part by the usual 60-cycle 110 volt line current to an oscillator 31 which provides oscillator current for the magnetic recorder head 32. A power supply 33 likewise activated by ordinary line current is provided for the high impedance amplifier 34 which receives the VHF or UHF input from the television set being monitored, a series of resonant circuit frequency detectors 35 and the rectification, switching logic circuitry 36, and the switching circuitry 37, all of which lead to the superimposition onto the oscillator current to record the appropriate signal on the magnetic recording heads 32.

The channel to which the monitored set is tuned can be determined by several methods for recording purposes. One method is to mechanically link an encoding device to the tuning mechanism (or mechanisms if there is a separate tuning module for UHF). The other and preferred method is to electrically monitor the local oscillator of the television set (or oscillators if the UHF range is included). The advantages of this method are that the electrical connection is simpler to make in the field than mechanical connection and that the "on/off"condition of the set is indicated by absence of any strong oscillator signal as opposed to a connection, electrical or mechanical, to the "on/off" switch. The recording device may be attached to the antenna terminals of the set for monitoring purposes and not interfere with reception.

The following table defines the ordinary television station carrier frequency available in the the Los Angeles area:

TABLE I

| Channel No. | Picture Freq. | Sound Freq. | Local Osc. Freq. |
|---|---|---|---|
| 2 | 55.25 mc. | 59.75 mc. | 101 mc. |
| 4 | 67.25 | 71.75 | 113 |
| 5 | 77.25 | 81.75 | 123 |
| 7 | 175.25 | 179.75 | 221 |
| 9 | 187.25 | 185.75 | 233 |
| 11 | 199.25 | 203.75 | 245 |
| 13 | 211.25 | 215.75 | 257 |
| 22 | 519.25 | 523.75 | 565 |
| 28 | 555.25 | 559.75 | 601 |
| 34 | 591.25 | 595.75 | 637 |

It should be noted that the sound carrier is always 4.5 mc. above the picture frequency and that the local oscillator frequency is always 47.75 mc. above the picture carrier frequency.

It can be seen from Table I that for the Los Angeles area, local oscillator frequencies of the 100 to 650 megacycle range must be detected. This frequency range is high, and active components such as vacuum tubes or, especially, transistors that work in this frequency range are scarce and expensive.

To detect which channel the set is tuned to is to a series of resonant circuits 35 that each respond to one local oscillator frequency are provided. For the VHF stations these may take the form of the familiar "tank" circuit; for the UHF stations these may take the form of capacitively loaded transmission lines. It can be seen from Table I that 10 resonant circuits are required to monitor the listed channels; three driven by the UHF stations and seven driven by the VHF channels.

Channel identification is therefore (1) indicated by the frequency of each local oscillator or lack of it (2) signal amplified by a radiofrequency amplifier stage; and (3) detection by the large oscillations of one of 10 resonant circuits (or none if the set is turned off).

The information of the resonant oscillation of the channel identifying tank circuits is processed to a form suitable for transmission and also to make it more compact. The form of this information is most inconvenient because high frequencies cannot be transmitted easily at high-power levels. Also they are unsuitable for driving most recording devices. The most convenient compaction scheme is a binary number system which can be represented as on or off (as, for example, the binary number 10 can be represented with two switches, one on and the other off). In Table II (which follows) the numeral "1" in the switch position represents switch "on" and the zeros represent switch "off."

TABLE II

| Channel No. | Switch 4 | Switch 3 | Switch 2 | Switch 1 |
|---|---|---|---|---|
| set off | 0 | 0 | 0 | 0 |
| 2 | 0 | 0 | 0 | 1 |
| 4 | 0 | 0 | 1 | 0 |
| 5 | 0 | 0 | 1 | 1 |
| 7 | 0 | 1 | 0 | 0 |
| 9 | 0 | 1 | 0 | 1 |
| 11 | 0 | 1 | 1 | 0 |
| 13 | 0 | 1 | 1 | 1 |
| 22 | 1 | 0 | 0 | 0 |
| 28 | 1 | 0 | 0 | 1 |
| 34 | 1 | 0 | 1 | 0 |

It can be seen from Table II that the four switches are sufficient to code the ten channels of the Los Angeles area along with the "off" condition of the set. There are even five states of the switches unused to allow for expansion of the number of channels monitored. The switches selected for this application may be of the electronic type since they will be required to respond to low signal levels.

The switches are driven by the tank circuits in the following way. The oscillating output of the tank circuits is rectified (biased to one side of "ground" reference) using, for example, a diode circuit, and the output of this circuit will be used to turn on the appropriate switch or switches. Sufficient power may be drawn to turn on four switches (only three for the example above), hence the power required to actuate the switches is slight.

As pointed out above, magnetic tape may be used to record the coded television viewing information transmitted by the switches. Recording is accomplished by frequency modulation. This method is simple and inexpensive and can employ a carrier signal of the ordinary 60 cycles per second available from any wall socket. This carrier is modulated by the output of the electronic switches. The switches are used to turn the carrier on or off the recording head as the switches are selected by the channel being watched. Four channel recording is required, one for each switch.

The selection of 60 cps. as a carrier, although this frequency is low for most ordinary applications, has an advantage, other than being easy to obtain. This is that the tape runs continuously through the monitor at a slow speed when recorded, but may be run extremely fast through the information processing equipment. If it is run 100 times as fast, for example, the 60 cps. frequency will appear to be 6,000 cps. The use of a higher frequency would put a limitation on the speed at which the information could be processed; no little consideration in view of the large number of home viewer tapes to be processed.

Since only the presence or absence of a large signal is detected by the processing equipment, frequency variations can be easily tolerated. These variations may be caused by either line frequency variation or by monitor tape drive speed variation. In view of the large signal and the relatively small information content (on or off), the signal-to-noise ratio of the system may be high.

The recorded tapes from many monitored television sets may be spliced together to form a long continuous tape. Timing "marks" may be added at the beginning and end of each record. Assume that decoding is done at the rate of 1,000 times the monitor rate (the resulting 60,000 cps. carrier is well within the present technology of magnetic tape systems); this means that one weeks' viewing will take about 10 minutes to process.

The tape information can be processed by a high-speed digital computer to provide many kinds of different information. Results are limited only by the fact that the set was monitored, not the people watching it.

While particular embodiments of this invention have been shown and described, it is not intended to limit the same to the exact details of the construction set forth and it embraces such changes, modifications and equivalents of the parts and their formation and arrangement as come within the purview of the appended claims.

I claim:

1. A method for monitoring the use of a television set and simultaneously displaying programming information to a viewer, comprising providing continuously operating multichannel recording and display means, means for simultaneously indicating available program information and determining which one of a series of television channels is functional at any time by constant monitoring of the output of said television set through detection of a signal from any operative channel thereof, amplifying said signal, imposing said signal on at least one channel of said multichannel recording and display means, and subsequently transcribing the presence or absence of said signal from said recording and display means.

2. The process of claim 1 where said recording and display means comprises a multichannel magnetic tape section and a display section containing programming information, and wherein said magnetic tape section is separated from said display section prior to said transcribing.

3. An apparatus for monitoring the use of a television set and simultaneously displaying programming information to a viewer, comprising continuously operating multichannel recording and display means, means for simultaneously indicating available program information and monitoring the output of said television set through detection of a signal from any operative channel thereof, means for amplifying said signal and means for imposing said signal on at least one channel of said multichannel recording and display means.

4. The apparatus of claim 3 where said recording and display means comprises a multichannel magnetic tape section and a display section containing programming information.

* * * * *